Oct. 17, 1933.　　　E. E. BROSIUS　　　1,930,467
MATERIAL HANDLING APPARATUS
Filed May 9, 1930　　　3 Sheets-Sheet 1
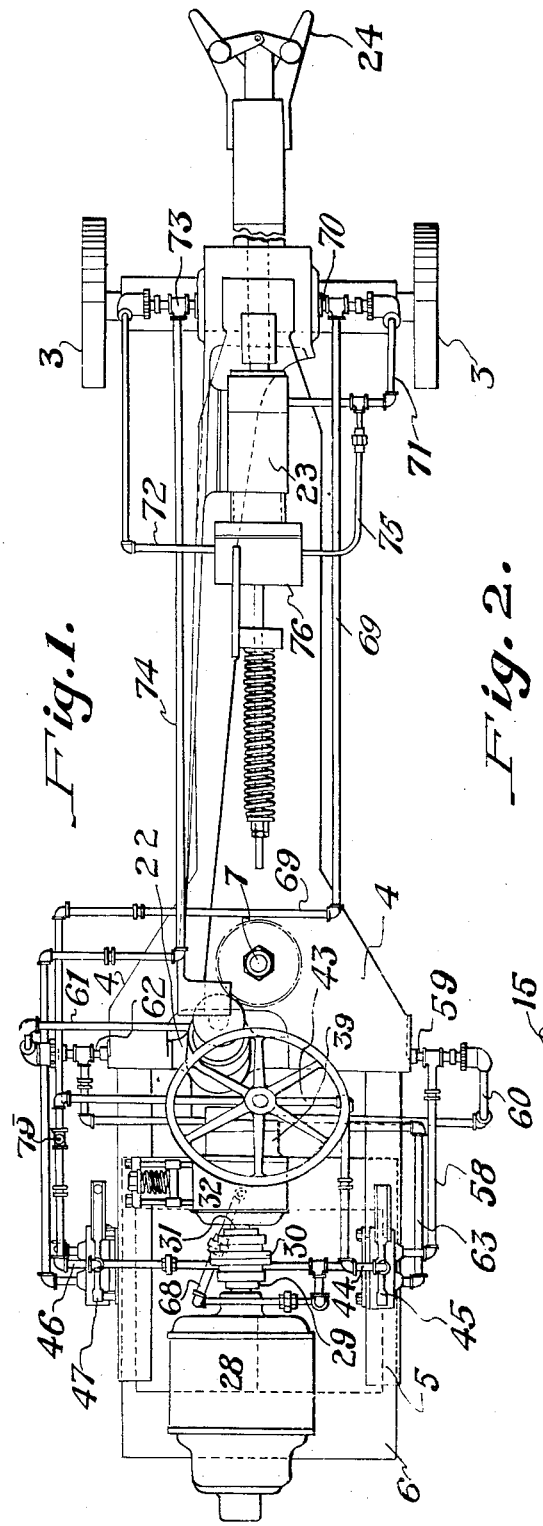
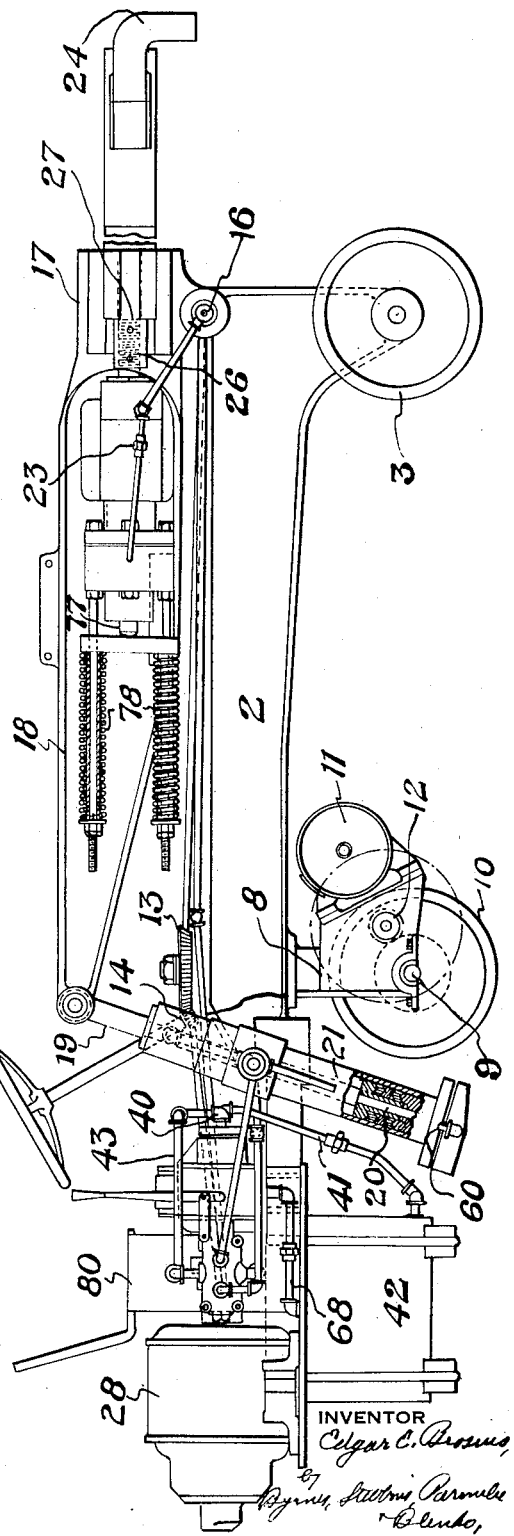
INVENTOR
Edgar E. Brosius

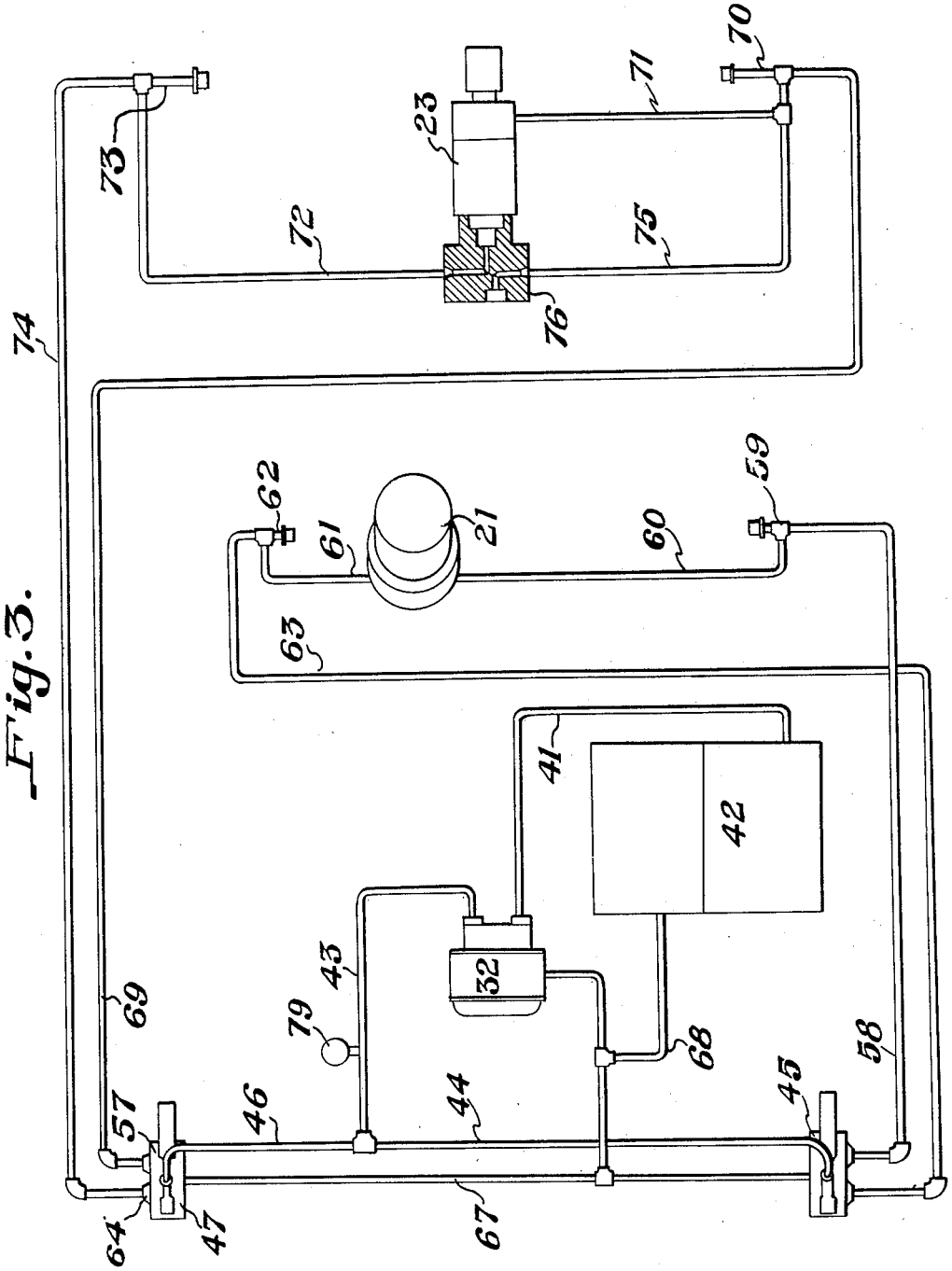

Oct. 17, 1933.  E. E. BROSIUS  1,930,467
MATERIAL HANDLING APPARATUS
Filed May 9, 1930  3 Sheets-Sheet 3
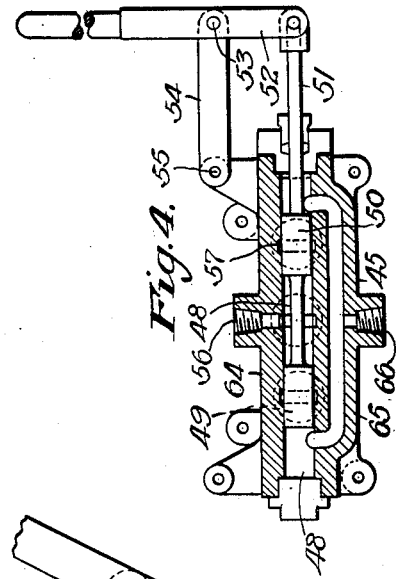
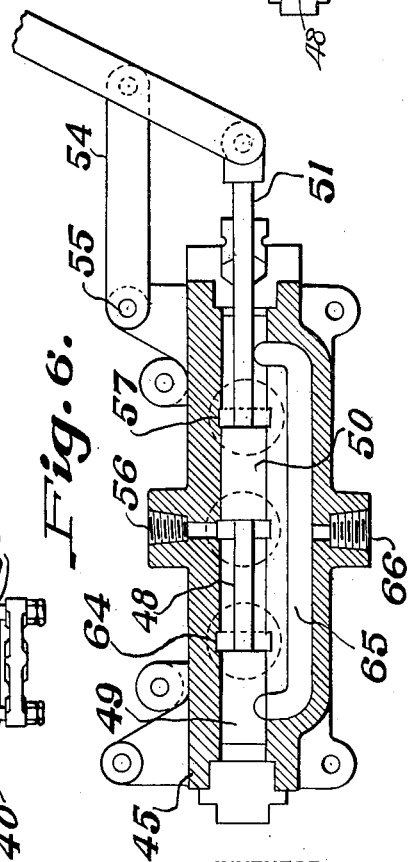
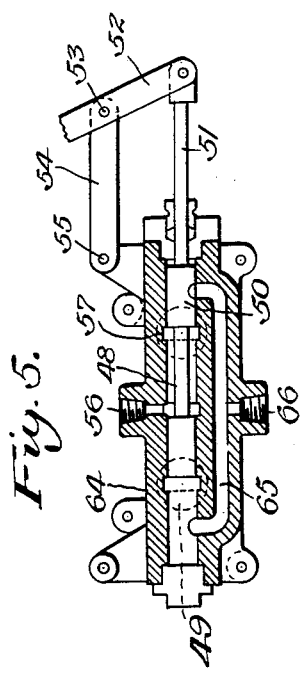
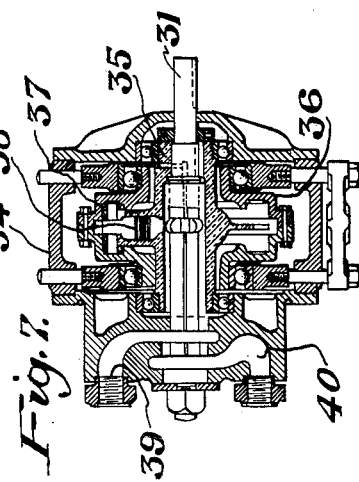
INVENTOR
Edgar E. Brosius, Patented Oct. 17, 1933

1,930,467

UNITED STATES PATENT OFFICE 1,930,467

MATERIAL HANDLING APPARATUS

Edgar E. Brosius, Pittsburgh, Pa.

Application May 9, 1930. Serial No. 451,047

7 Claims. (Cl. 214—27)

The present invention relates to material handling apparatus, and more especially to a furnace charging apparatus. An object of the invention is to provide an improved furnace charging apparatus which is mobile, positive in its action, and which can be readily manipulated by the operator. As hereinafter more particularly described, the apparatus consists generally of a wheeled truck having a pivotally mounted material handling peel provided with hydraulic manipulating means.

In the drawings, Figure 1 is a top plan view of one form of portable charging apparatus constructed in accordance with the present invention, Figure 2 is a side elevational view of the apparatus illustrated in Figure 1, Figure 3 is a diagrammatic view of the fluid pressure connections, Figures 4, 5 and 6 are detail sectional views of one of the control valves illustrating the plunger in its three different positions, and Figure 7 is a detail view illustrating one form of pressure producing means.

In accordance with the embodiment of the invention illustrated more particularly in Figures 1, 2 and 3 of the drawings, there is provided a suitable truck, the frame of which conveniently comprises an elongated casting 2 shaped at its front end to provide a suitable mounting for a pair of wheels 3. At its rear end the truck frame is preferably bifurcated to provide angularly extending arms 4 to each of which may be secured a support 5 adapted to extend rearwardly and carry a platform 6.

Adjacent its rear end, the truck frame is machined to receive a vertically extending shaft 7 projecting upwardly from a steering wheel frame 8. This steering wheel frame carries a transversely extending shaft 9 for the wheel 10, this wheel being adapted to be driven in any desired manner, as, for example, by a motor 11 through suitable gearing 12. The wheel 10 provides a driven third wheel adapted to be used as a steering wheel for guiding the truck, whereby it may rapidly be swung from one position to the other without limitation such as imposed by tracks of the character ordinarily used with charging machines. This may be accomplished by securing to the upper end of the shaft 7 a bevel gear 13 with which meshes a similar gear 14 secured to the shaft of a steering wheel 15.

By reason of the construction just described, it will be apparent that the driving wheel 10 may be quickly turned to any desired angular position whereby the truck may be bodily advanced along an angular line, or whereby the rear end of the truck may be moved laterally at any desired angle without materially changing the position of one of the front wheels 3. The provision of a single wheel at the rear of the frame is decidedly advantageous as it enables a more flexible operation of the truck.

Adjacent the front end of the truck, substantially in the plane of the upper surface of the part 2 and preferably in the vertical plane of the axes of the front wheels 3 is a pivotal mounting 16 for a peel 17. The peel has a rearwardly extending portion 18 to which is pivotally connected the upper end of a peel tilting piston rod 19. This piston rod is secured to a piston 20 within a suitable cylinder 21.

In order to permit swinging movement of the peel operating cylinder 21 as required to accommodate the movement of the piston rod 19, it is provided with trunnions 22 journaled in the ends of the bifurcations 4.

Also carried by the rearwardly extending portion 18 is a cylinder 23 constituting an operating motor for the tongs 24 secured to the forward end of the peel. Mounted within the cylinder 23 is a piston 25, the piston rod 26 of which is secured to a rod 27 extending longitudinally through the peel and connected in any desired manner to the tongs 24 for effecting operation thereof.

Mounted on the platform 6 is a motor 28, the armature shaft 29 of which is secured by a suitable coupling 30, preferably of the flexible type, to the shaft 31 of a fluid pressure pump 32. This pump may be of any desired type, but is conveniently of the construction illustrated in detail in Figure 7 and known as a Hele-Shaw pump. Such a pump includes a housing 34 within which is mounted a sleeve 35 adapted to be driven by the shaft 31 coupled to the motor 28. Working within an adjustable frame 36 is a series of shoes 37, each of which carries a plunger 38. The casing is provided with two ports 39 and 40 adapted to serve either as inlet or outlet ports depending upon the position to which the frame 36 is shifted. With the frame in central position, as will be understood by those skilled in the art, rotation of the shiftable frame 26 produces no reciprocation of the plungers 38, while with the frame shifted off-center, the plungers are effective during half of each revolution for exhausting fluid, and during the other half of the revolution for directing fluid into position to be subsequently exhausted.

In accordance with the present invention it is contemplated that the frame, during periods of operation of the pump, will be shifted in such direction that the port 39 will serve as the outlet and 40 as the intake. The intake has a suitable connection 41 to a reservoir 42 conveniently carried below the platform 6 and adapted to be filled with a non-compressible fluid such, for example, as oil. Upon operation of the pump, assuming the shiftable frame to be in an off-center position, oil will be drawn upwardly through the connection 41 into the pump and discharged therefrom through the port 39 into a manifold 43. This manifold has a connection 44 to the inlet port of a peel tilting control valve 45 and a second connection 46 to the inlet port of a tong motor control valve 47.

These valves are preferably of identical construction as illustrated in detail in Figures 4, 5 and 6, and therefore only one of the valves will be described in detail. In Figures 4, 5 and 6, the peel tilting control valve 45 has been illustrated. The same reference characters, however, apply to the tong motor control valve 47, except that a prime has been affixed to the corresponding reference characters of such tong motor control valve.

Mounted in the axial opening 48 of the valve is a control plunger including enlargements 49 and 50 with an extension 51 pivotally connected to the lower end of an operating lever 52 having a pivotal mounting 53 in a link 54. This link in turn has a pivotal mounting 55 on the valve casing. The inlet port 56 leads into the valve intermediate the enlargements 49 and 50. With the plunger in the position illustrated in Figure 4, oil delivered to the valve is not permitted to escape therefrom. Where, however, the plunger is moved to its Figure 5 position, a port 57 is placed in communication with the inlet port 56 and oil passes from such port 57 to a connection 58. This connection has a rotatable mounting 59 concentric with the tilting axis of the cylinder 21 as afforded by the trunnions 22. From this mounting a connection 60 leads to the lower end of the cylinder 21. With the control valve in Figure 5 position, this oil is effective for moving the piston rod 19 upwardly and thereby swinging the peel in a clockwise direction about its pivotal mounting 16. During this movement oil is discharged from the upper end of the cylinder 21 through a second connection 61 leading to a mounting 62 similar to the mounting 59. From this mounting a connection 63 leads to a port 64 in the valve casing.

With the plunger in the position just described, the port 64 is uncovered, thereby permitting such oil to flow into a longitudinally extending passage 65 which communicates with an exhaust port 66. This exhaust port and the corresponding exhaust port 66' of the tong motor control valve are connected to a manifold 67 from which a connection 68 leads into the reservoir 42. Thus, as the piston in the peel tilting cylinder moves upwardly due to the oil supplied to the lower end of the cylinder, the oil in the upper end of the cylinder is returned to the reservoir.

By shifting the plunger to its Figure 6 position, the port 64 is connected to the intake 56 and the port 57 connected to exhaust 66, thus reversing the direction of fluid flow and permitting a return movement of the peel.

In similar manner, the tong motor control valve, when moved to a position corresponding to the Figure 5 position, will deliver fluid through the port 57' to a connection 69 leading to a rotatable mounting 70 concentric with the axis of the pivotal mounting 16. From this mounting a connection 71 leads to the front end of the cylinder 23. The opposite end of the cylinder has a connection 72 to a rotatable mounting 73, similar to the mounting 70, and having a connection 74 to the port 64'. Thus, by shifting the control valve 47 the piston rod 26 may be moved in one direction or the other for either opening or closing the tongs 24.

Communicating with the connection 71 is a pressure connection 75 leading into the cylinder 76 behind a plunger 77 which cooperates with springs 78 through a suitable cross-head. By reason of this construction, when fluid is delivered through the connection 71 into the front end of the cylinder 23 for retracting the rod 26 and thereby closing the tongs, fluid is also delivered into the cylinder 76 in such manner as to force the plunger 77 outwardly to compress the springs 78.

From the foregoing description, it will be apparent that there is provided a self-contained portable apparatus supplying its own fluid pressure for operating the various parts of the unit. In case of failure of any of the mechanical connections, for example, after the tongs 24 have been closed about a billet, the control valve 47 may be shifted to its neutral position corresponding to Figure 3, for locking the tong motor against movement in either direction. Any leakage which may occur past the piston is immediately compensated by the action of the springs 78, these springs being effective through the plunger 77 for forcing a make-up supply into position in front of the piston and thereby take care of any such leakage. This auxiliary plunger connection therefore always stands ready to make up any loss by leakage and insures maintenance of pressure on tongs keeping the parts in the position to which they have been moved.

Since the pressure producing means is under the direct control of the operator, he is advised at all times of the exact pressure conditions, it being customary to provide a suitable gauge 79 in the manifold 43, which gauge is located in position to be readily accessible to an operator on the seat 80 carried by the platform 6.

While I have illustrated and described the preferred embodiment of my invention, it will be understood that the invention is not so limited but may be otherwise embodied and practiced within the scope of the following claims.

I claim:

1. In a furnace charging apparatus, a wheeled truck having propelling means, said truck comprising a body having a peel pivotally mounted thereon, material engaging means carried by said peel, a hydraulic cylinder and piston for operating said material engaging means, and fluid supply connections to said cylinder having swivel connections coincident with the pivotal mounting of said peel.

2. In a furnace charging apparatus, a wheeled truck having propelling means, said truck comprising an elongated body having a peel pivotally mounted thereon adjacent one end thereof, material engaging means carried by said peel, a hydraulic cylinder and piston for operating said material engaging means, and fluid supply connections to opposite ends of said cylinder having swivel connections coincident with the pivotal mounting of said peel.

3. In a furnace charging apparatus, a wheeled truck having propelling means, said truck comprising a body having a peel pivotally mounted thereon adjacent one end thereof and projecting forwardly beyond said end of the body, material engaging means carried by said peel, a hydraulic cylinder and piston for operating said material engaging means, fluid supply connections to said cylinder having swivel joints coincident with the pivotal mounting of said peel, an operator's platform adjacent the opposite end of said body, and means carried by said platform for delivering a controllable supply of fluid to said connections.

4. In a furnace charging apparatus, a wheeled truck having propelling means, said truck comprising a body having a peel pivotally mounted thereon adjacent one end thereof and projecting forwardly beyond said end of the body, material engaging means carried by said peel, a hydraulic cylinder and piston for operating said material engaging means, fluid supply connections to said cylinder having swivel joints coincident with the pivotal mounting of said peel, an operator's platform adjacent the opposite end of said body, and means carried by said platform for delivering a controllable supply of fluid to said connections, said means including a fluid reservoir and pump.

5. In a furnace charging apparatus, a wheeled truck having propelling means, said truck comprising a body having a peel pivotally mounted thereon and projecting forwardly from one end thereof, material engaging means carried by said peel, a hydraulic cylinder and piston for operating said material engaging means, fluid supply connections to said cylinder having swivel joints coincident with the pivotal mounting of said peel, a pivotally mounted hydraulic cylinder and piston for tilting said peel, fluid connections to said pivotally mounted cylinder having swivel joints coincident with its pivotal mounting, an operator's platform, and means on said platform for supplying fluid in controllable quantities to said connections at will.

6. In a furnace charging apparatus, a wheeled truck having propelling means, said truck comprising a body having a peel pivotally mounted thereon and projecting forwardly beyond one end thereof, material engaging means carried by said peel, a hydraulic cylinder and piston for operating said material engaging means, a circulating pump cooperating therewith, a reservoir, fluid pressure connections including swivel joints coincident with the pivotal mounting of said peel, and a single control means for said connections, said control means being effective for connecting said pump to said cylinder or connecting said cylinder to said reservoir.

7. In a furnace charging apparatus, a wheeled truck having propelling means, said truck comprising a body having a peel pivotally mounted thereon and projecting forwardly beyond one end thereof, material engaging means carried by said peel, a hydraulic cylinder and piston for operating said material engaging means, a circulating pump cooperating therewith, a reservoir, fluid pressure connections including swivel joints coincident with the pivotal mounting of said peel, and a single control means for said connections, said control means being effective for connecting said pump to said cylinder or connecting said cylinder to said reservoir, and also being movable to a neutral position to trap fluid within said cylinder.

EDGAR E. BROSIUS.